(12) United States Patent
Takeuchi et al.

(10) Patent No.: US 8,899,163 B2
(45) Date of Patent: Dec. 2, 2014

(54) BIOMASS PULVERIZING APPARATUS AND BIOMASS/COAL MIXED-COMBUSTION SYSTEM

(75) Inventors: Kazuhiro Takeuchi, Minato-ku (JP);
Takuichiro Daimaru, Minato-ku (JP);
Masaaki Kinoshita, Minato-ku (JP);
Yoshiki Yamaguchi, Minato-ku (JP);
Norichika Kai, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 13/697,610

(22) PCT Filed: May 12, 2011

(86) PCT No.: PCT/JP2011/060998
§ 371 (c)(1),
(2), (4) Date: Nov. 13, 2012

(87) PCT Pub. No.: WO2011/142438
PCT Pub. Date: Nov. 17, 2011

(65) Prior Publication Data
US 2013/0055934 A1    Mar. 7, 2013

(30) Foreign Application Priority Data
May 14, 2010    (JP) .................... 2010-112463

(51) Int. Cl.
*F23K 1/00*    (2006.01)
*F23G 5/033*    (2006.01)
(Continued)

(52) U.S. Cl.
CPC ............ *F23G 5/033* (2013.01); *F23K 2201/30* (2013.01); *F23K 1/00* (2013.01);
(Continued)

(58) Field of Classification Search
USPC .............. 110/222, 232, 106; 241/79, 52, 117, 241/119, 121, 111, 57, 65, 47, 46.15
See application file for complete search history.

(56) References Cited

U.S. PATENT DOCUMENTS

1,480,767 A    1/1924    Kreutzberg
2,356,753 A    8/1944    Dotzer
(Continued)

FOREIGN PATENT DOCUMENTS

CN    85108678    6/1986
CN    2129174    4/1993
(Continued)

OTHER PUBLICATIONS

International Search Report issued Aug. 9, 2011 in International (PCT) Application No. PCT/JP2011/060998.
(Continued)

*Primary Examiner* — Kenneth Rinehart
*Assistant Examiner* — Tavia Sullens
(74) *Attorney, Agent, or Firm* — Wenderoth, Lind & Ponack, LLP

(57) ABSTRACT

A biomass pulverizing apparatus includes a pulverizing apparatus body including a feedstock supply pipe, the pulverizing apparatus body for supplying biomass feedstock from above in a vertical axial direction, a pulverizing table for placing the biomass feedstock, a drive section for rotationally driving the pulverizing table, a pulverizing roller for pulverizing the biomass feedstock by a pressing force, the pulverizing roller being operated in conjunction with the rotation of the pulverizing table, a blower unit for forming an upward flow upward from below on the outer peripheral side of the pulverizing table so as to jet conveying gas for conveying the pulverized biomass powder in an air stream, a classifier, the classifier for classifying the biomass powder accompanied with the conveying gas, and a blowing gas introduction section.

4 Claims, 6 Drawing Sheets

(51) Int. Cl.
*B02C 15/00* (2006.01)
*B02C 23/40* (2006.01)
*C10L 5/36* (2006.01)
*F23G 7/10* (2006.01)
*F23K 1/04* (2006.01)
*B02C 23/24* (2006.01)
*C10L 5/04* (2006.01)
*C10L 5/44* (2006.01)

(52) U.S. Cl.
CPC ............... *F23C 2900/01001* (2013.01); *F23K 2201/103* (2013.01); *F23G 2201/602* (2013.01); *F23K 2201/501* (2013.01); *Y02E 50/10* (2013.01); *Y02E 50/30* (2013.01); *C10L 5/366* (2013.01); *F23G 7/10* (2013.01); *F23K 1/04* (2013.01); *B02C 23/24* (2013.01); *C10L 5/04* (2013.01); *B02C 2015/002* (2013.01); *F23G 2201/60* (2013.01); *F23K 2201/10* (2013.01); *B02C 15/007* (2013.01); *C10L 5/44* (2013.01)
USPC .......................... 110/222; 110/232; 241/119

(56) References Cited

U.S. PATENT DOCUMENTS

| | | | |
|---|---|---|---|
| 4,034,921 A | | 7/1977 | Schnitzer |
| 4,529,135 A | | 7/1985 | Urayama |
| 4,611,765 A | * | 9/1986 | Shimojima et al. ........... 241/121 |
| 5,381,968 A | * | 1/1995 | Lohnherr et al. ................ 241/19 |
| 5,845,855 A | | 12/1998 | Yamada et al. |
| 7,334,345 B2 | * | 2/2008 | Lasonde ......................... 34/181 |
| 8,383,870 B2 | * | 2/2013 | Knight et al. ................. 585/240 |
| 2009/0078175 A1 | | 3/2009 | Eiteneer et al. |

FOREIGN PATENT DOCUMENTS

| | | |
|---|---|---|
| CN | 1122263 | 5/1996 |
| CN | 1256183 | 5/2006 |
| CN | 1803296 | 7/2006 |
| EP | 0 068 681 | 1/1983 |
| GB | 2100617 A * | 1/1983 ............. B02C 15/14 |
| JP | 58-6248 | 1/1983 |
| JP | 62-269764 | 11/1987 |
| JP | 02-135160 | 5/1990 |
| JP | 10-180126 | 7/1998 |
| JP | 2000-237626 | 9/2000 |
| JP | 2002-59017 | 2/2002 |
| JP | 2004-347241 | 12/2004 |
| JP | 2007-111604 | 5/2007 |
| JP | 2008-082651 | 4/2008 |
| JP | 2009-291692 | 12/2009 |
| JP | 2010-46658 | 3/2010 |
| WO | 2009/157335 | 12/2009 |

OTHER PUBLICATIONS

Written Opinion of the International Searching Authority issued Aug. 9, 2011 in International (PCT) Application No. PCT/JP2011/060998.
U.S. Office Action issued Apr. 16, 2013 in U.S. Appl. No. 13/697,618.
International Search Report issued Aug. 9, 2011 in International (PCT) Application No. PCT/JP2011/060997.
Written Opinion of the International Search Authority issued Aug. 9, 2011 in international (PCT) Application No. PCT/JP/2011/060997.
Chinese Office Action (with English Translation) dated Dec. 3, 2013 in Chinese Application No. 201180023610.8.
Chinese Office Action (with English Translation) dated Dec. 4, 2013 in Chinese Application No. 201180023614.6.
U.S. Office Action issued Feb. 13, 2014 in co-pending U.S. Appl. No. 13/697,618.
Decision of Patent Grant dated Oct. 7, 2014 issued in corresponding Japanese Patent Application No. JP2010-112463 (with Partial English Translation).
Decision of Patent Grant dated Oct. 7, 2014 issued in corresponding Japanese Patent Application No. JP2010-112464 (with Partial English Translation).
Chinese Office Action and Search Report dated Jul. 25, 2014 issued in corresponding Chinese Patent Application No. 201180023614.6. (with English translation).

* cited by examiner

BIOMASS PULVERIZING APPARATUS AND BIOMASS/COAL MIXED-COMBUSTION SYSTEM

FIELD

The present invention relates to a biomass pulverizing apparatus and a biomass/coal mixed-combustion system that crush and pulverize biomass solid matter.

BACKGROUND

In recent years, reduction of $CO_2$ emissions has been promoted from a viewpoint of global warming. Particularly, in combustion facilities, such as boilers for power generation, fossil fuels, such as coal and heavy fuel oil, are used as fuel in many cases. However, this fossil fuel causes global warming from the problems of $CO_2$ emission, and the use thereof is being regulated from the standpoint of earth environmental preservation. Further, development and practical use of energy resources that substitute for this are required also from a viewpoint of exhaustion of fossil fuels. Therefore, utilization of fuel using biomass is promoted as an alternative to fossil fuels. The biomass is organic matter resulting from photosynthesis, and there is biomass, such as woody material, plants, agricultural products, and kitchen waste. By processing this biomass as fuel, the biomass can be effectively used as an energy source or an industrial source.

Using the biomass as fuel is performed from a viewpoint of efficient utilization of the biomass that is renewable energy. As one of the methods of using the biomass as fuel, there is a method of pulverizing solid biomass matter and supplying the pulverized matter to a pulverized coal burning boiler for use as fuel. In this method, an independent pulverization type that pulverizes coal and the biomass independently, and a mixed pulverization type that performs pulverization after coal and the biomass are mixed are known. In both types, a biomass pulverizing apparatus for pulverizing solid biomass matter is required. However, in a case of attempting to use an existing mill used with the coal burning boiler of the related art, a mixed combustion rate with respect to coal remains at about 3 cal % at maximum from the capability constraints of the existing mill.

In order to pulverize the biomass of the related art to a particle diameter for the coal burning boiler, a coal pulverizer is used as it is, for example, biomass feedstock is input into a pulverizing table within a pulverizing apparatus, and is pulverized, dried, and classified by pulverizing rollers that rotate in conjunction with the pulverizing table. Then, the pulverized biomass is conveyed to the burner side in an air stream (refer to Patent Documents 1 and 2).

CITATION LIST

Patent Literature

Patent Literature 1: Japanese Laid-open Patent Publication No. 2004-347241
Patent Literature 2: Japanese Laid-open Patent Publication No. 2009-291692

SUMMARY

Technical Problem

However, in a case where woody biomass feedstock is pulverized using the coal pulverizing apparatus of the related art, there are the following problems.

1) Since the woody biomass feedstock has compressibility unlike coal, there is a problem in that pressure is not sufficiently transmitted to the biomass feedstock and pulverization is difficult in a case where the feedstock is bitten into the pulverizing rollers and the pulverizing table and is pulverized.

Further, since the biomass feedstock has high moisture content, and is fibrous, in a case where the feedstock is sandwiched between the pulverizing rollers and the pulverizing table and is pressed, the pulverized biomass powder (fine powder) is entangled with each other, and has a property of being difficult to separate.

For this reason, even if being pulverized by the coal pulverizing apparatus of the related art, the coarse particles and fine powder of the pulverized biomass powder are solidified and become difficult to move. As a result, there are problems in that excessive pulverization occurs, the pulverization processing amount of the biomass feedstock declines significantly compared to the case of coal pulverization, and the consumption power in the pulverizing apparatus increases.

Moreover, even in a case where mixed pulverization is performed with coal, if a mixed pulverization rate is generally raised with 5 to 10% up to a mixing limit of the woody biomass feedstock, there are problems in that the particle size of the fine powder declines and the combustion efficiency in the burner deteriorates.

Further, since the power of the pulverizing apparatus increases, it is necessary to lower the capacity of the pulverizing apparatus to perform operation.

2) Further, in order to perform floating combustion of the woody biomass feedstock using the coal burning boiler of the related art, it is necessary to perform pulverization such that an average particle diameter is about 0.5 to 1 mm. However, there is a problem in that, for example, pulverizing a large amount to this size, using a hammer mill or a cutter mill, is inefficient.

3) Moreover, since the woody biomass powder (coarse particles) that is not sufficiently pulverized have an irregular shape, and is apt to be entangled with each other, even if the woody biomass powder is discharged from the outer peripheral portions of the pulverizing rollers, and rises due to a jet air current provided around the pulverizing table, there are problems in that separation of the coarse particles and the fine powder is not easy, and a ratio in which pulverization is performed to exceed a particle diameter required for burning-out increases, and pulverization power increases.

Thus, unlike the pulverizing apparatus that uses the coal pulverizing apparatus of the related art, the appearance of a biomass pulverizing apparatus that can pulverize the woody biomass feedstock efficiently and stably is desired.

An object of the invention is to provide a biomass pulverizing apparatus and a biomass/coal mixed-combustion system that can pulverize biomass feedstock efficiently and stably in view of the above problems.

Solution to Problem

According to a first aspect of the inventions in order to solve the above-problems, there is provided biomass pulverizing apparatus including: a pulverizing apparatus body including a feedstock supply pipe for supplying biomass feedstock from above in a vertical axial direction; a pulverizing table for placing the supplied biomass feedstock; a drive section for rotationally driving the pulverizing table; a pulverizing roller for pulverizing the biomass feedstock by a pressing force, the pulverizing roller being operated in conjunction with the rotation of the pulverizing table; a blower unit for forming an upward flow upward from below on the outer peripheral side of the pulverizing table so as to jet conveying gas for conveying the pulverized biomass powder in an air stream; a classifier that is provided inside the top of the pulverizing apparatus body, the classifier for classifying the biomass powder accompanied with the conveying gas; and a blowing gas introduction section for supplying blowing gas toward a central portion of the pulverizing table and for promoting the movement of the biomass feedstock.

According to a second aspect of the inventions, there is provided the biomass pulverizing apparatus according to the first aspect, wherein the blowing gas is heated.

According to a third aspect of the inventions, there is provided the biomass pulverizing apparatus according to the first or second aspect, wherein the shape of small-diameter end portion of the pulverizing roller on the center side of the pulverizing table is made into a tapered shape.

According to a fourth aspect of the inventions, there is provided the biomass pulverizing apparatus according to any one of the first to third aspects, further including a dispersion flow introduction section for introducing dispersion gas in a direction orthogonal to the vertical axial direction from the periphery of the pulverizing apparatus body so as to disperse and drop biomass powder of a predetermined particle diameter or more accompanied by the conveying gas.

According to a fifth aspect of the inventions, there is provided a biomass/coal mixed-combustion system including: the biomass pulverizing apparatus according to any one of the first to fourth aspects; a coal pulverizing apparatus for pulverizing coal feedstock; and a boiler furnace to which biomass powder pulverized by the biomass pulverizing apparatus and coal powder pulverized by the coal pulverizing apparatus are supplied.

Advantageous Effects of Invention

According to the invention, since the blowing gas is supplied toward the central portion of the pulverizing table and promotes movement of the biomass feedstock, the biomass feedstock can be efficiently and stably pulverized.

DESCRIPTION OF EMBODIMENTS

Figure 1:
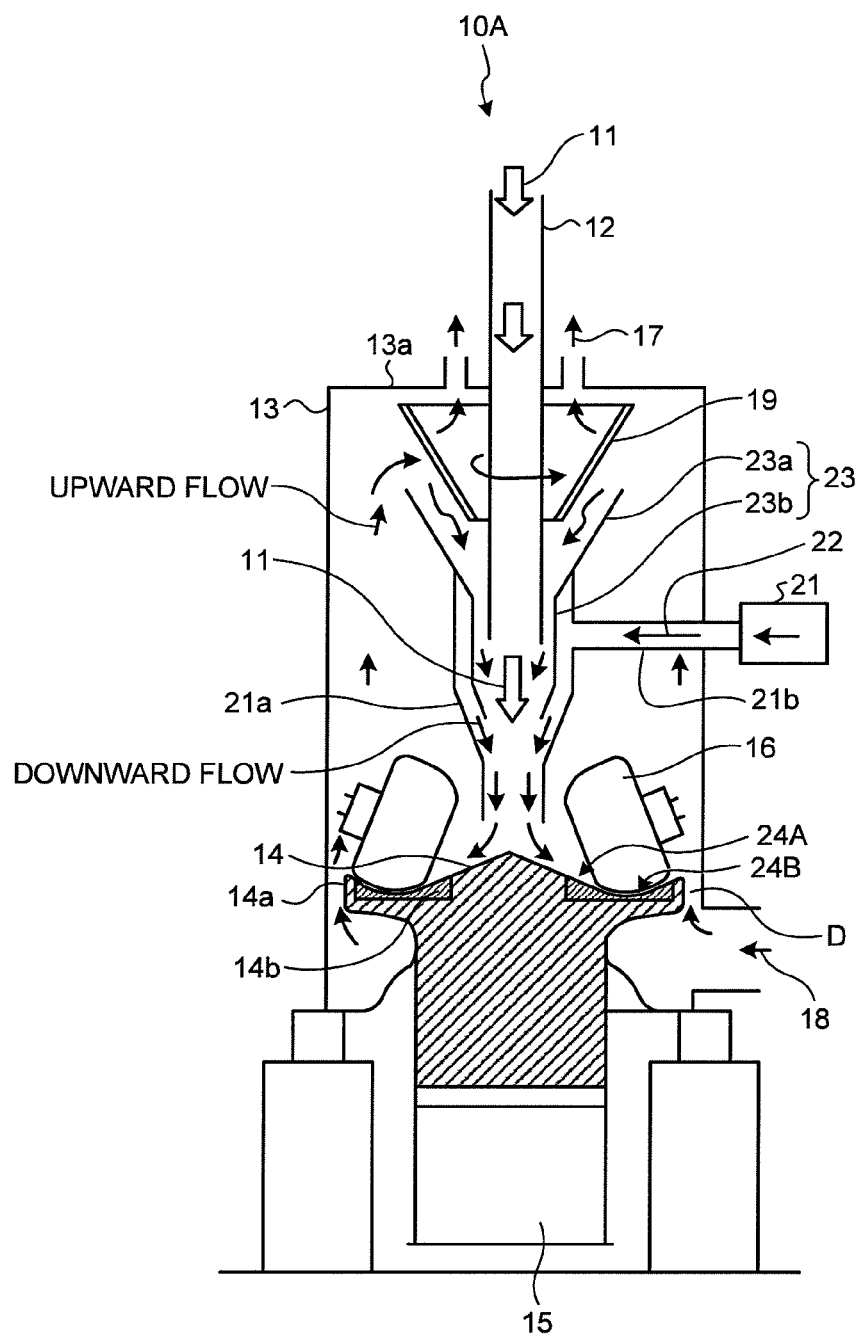
FIG. 1 is a schematic view of a biomass pulverizing apparatus according to a first embodiment.

The invention will be described below in detail while referring to the drawings. Note that, the invention is not limited by the embodiments. Further, constituent elements in the following embodiments include elements that are easily conceivable by a person skilled in the art, or substantially the same elements.

First Embodiment

Figure 2:
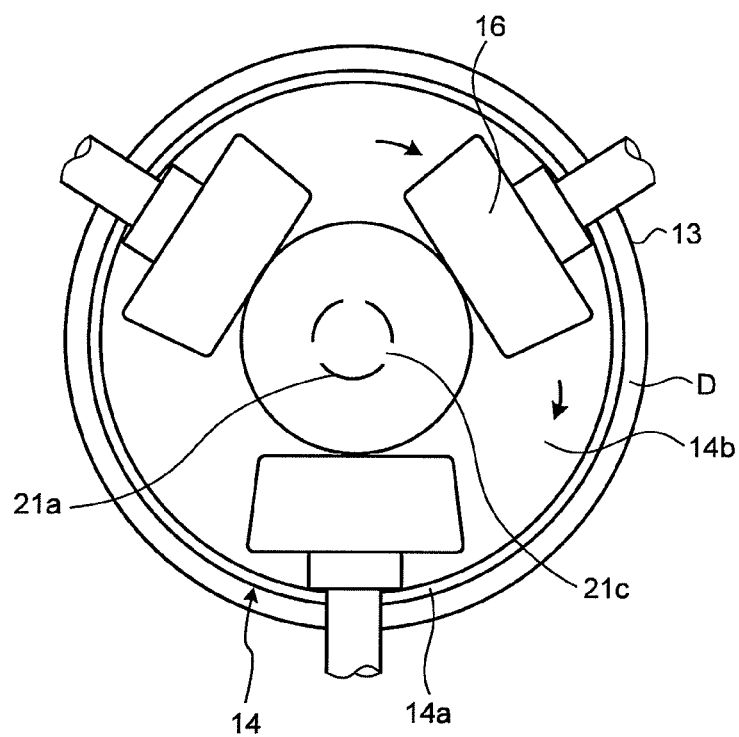
FIG. 2 is a cross-sectional schematic view of the biomass pulverizing apparatus according to the first embodiment.

A biomass pulverizing apparatus according to a first embodiment of the invention will be described with reference to the drawings. FIG. 1 is a schematic view of the biomass pulverizing apparatus according to the present embodiment. FIG. 2 is a cross-sectional schematic view of the biomass pulverizing apparatus according to the first embodiment.

As illustrated in FIGS. 1 and 2, a biomass pulverizing apparatus 10A according to the present embodiment includes a pulverizing apparatus body 13 having a feedstock supply pipe 12 that supplies biomass feedstock 11 from above in a vertical axial direction, a pulverizing table 14 on which the supplied biomass feedstock 11 is placed, a drive section 15 that rotationally drives the pulverizing table 14, pulverizing rollers 16 that are operated in conjunction with the rotation of the pulverizing table 14 and pulverize the biomass feedstock 11 by a pressing force, blower unit (not illustrated) that forms an upward flow upward from below on the outer peripheral side of the pulverizing table 14 and jets conveying gas 18 that conveys the pulverized biomass powder 17 in an air stream, a classifier 19 that is provided inside the top of the pulverizing apparatus body 13 and classifies the biomass powder 17 accompanied with the conveying gas 18, and a blowing gas introduction section 21 that supplies blowing gas 22 toward a central portion of the pulverizing table 14 and promotes the movement of the biomass feedstock 11.

The pulverizing table 14 is formed in a substantially circular trapezoidal shape, the upper surface of the pulverizing table 14 is formed in a concave shape so that the biomass solid matter placed on this table does not fall off, and a weir 14a is on the outer peripheral side of the upper surface. Further, a freely replaceable table liner 14b is provided in order to prevent wear of the pulverizing table 14.

Note that, a motor (not illustrated) is connected to a drive shaft (not illustrated) that is provided to extend from the lower side of the pulverizing table 14, and the pulverizing table 14 is rotated by the motor.

The pulverizing rollers 16 are provided above a position shifted outward from the center of the pulverizing table 14. The pulverizing rollers 16 exert a pressing force on the biomass feedstock 11 placed on the table liner 14b of the pulverizing table 14 while rotating in conjunction with the pulverizing table 14, and pulverize this biomass feedstock.

At this time, a speed reducer is connected to the motor, and a variable hydraulic power source or a spring that changes pulverization load is connected to the pulverizing rollers 16. A control can be performed by a control device (not illustrated) so that the pulverization load of the pulverizing rollers 16 is increased and decreased in a stepless fashion or in a stepwise fashion and pulverization power falls within a rated range, and preferably becomes almost constant.

The feedstock supply pipe 12 is inserted through a top plate 13a of the pulverizing apparatus body 13 in the vertical axial direction, and is installed so that the biomass feedstock 11 is dropped onto the pulverizing table 14.

The classifier 19 secondarily classifies a slightly fine powder and granular material after passing through pneumatic classification (primary classification) by conveying gas (primary air) 18, and a fixed classifier (cyclone separator) or a rotary classifier (rotary separator) is used.

In the classifier 19 of the present embodiment, a funnel-shaped classifier is used, and coarse particles and fine particles are classified by classifying vanes provided in an opening (not illustrated). The classified coarse particles fall to the pulverizing table 14 side where pulverization is performed again.

The blower unit that supplies the conveying gas (primary air) 18 supplies primary air with a predetermined flow rate and a predetermined temperature into the apparatus body 13 from the periphery of the pulverizing table 14, and a damper or the like is used for adjustment of an air flow rate. Further, temperature control unit is provided if needed. The air flow rate or temperature is appropriately controlled by the control device (not illustrated).

A gap D is provided between the outer peripheral edge of the pulverizing table 14 and the inner peripheral surface of the apparatus body 13, and the conveying gas (primary air) 18 supplied from the blower unit blows to the upper side of the pulverizing table 14 via the gap D. Note that, drift vanes (not illustrated) may be provided in the gap D. The drift vanes adjust the direction of the blowdown of the primary air, and the angle of the drift vanes may be controlled arbitrarily.

A funnel-shaped rectifying member 23 with the same shape as the classifier 19 is fixed at a predetermined interval from the classifier 19 on the side of an upper portion of the apparatus body 13 and is provided to extend downward. The funnel-shaped rectifying member 23 drops the biomass powder (coarse particles) classified by the classifier 19 to the pulverizing table 14 again. The funnel-shaped rectifying member 23 is formed from a funnel portion 23a that receives the classified biomass powder (coarse particles) that is expanded and contracted from an upper portion of the rectifying member toward a lower portion thereof, and a tubular portion 23b that has a predetermined interval from the feedstock supply pipe 12 and drops the biomass powder (coarse particles).

Note that, a lower end portion of the tubular portion 23b of the funnel-shaped rectifying member 23 is reduced in diameter and prevents diffusion of the biomass powder (coarse particles) that is classified and falls.

An introduction pipe 21a that introduces blowing gas 22 from the blowing gas introduction section 21 is disposed at a predetermined interval around the tubular portion 23b of the funnel-shaped rectifying member 23. Note that, the blowing gas 22 is supplied to the introduction pipe 21a via a supply pipe 21b that is provided horizontally from the gas introduction section.

Then, the blowing gas 22 introduced via the supply pipe 21b is introduced downward from the periphery of the tubular portion 23b of the funnel-shaped rectifying member 23, and forms a downward flow toward the central portion of the pulverizing table 14. The downward flow of the blowing gas 22 promotes the movement of the biomass feedstock 11, which has fallen to the pulverizing table 14, to the pulverizing rollers 16 side.

Since the biomass feedstock 11 is introduced from the central portion of the pulverizing table 14 to the center side of the pulverizing rollers 16 by introducing the blowing gas 22, blowing of the biomass to a rough pulverization region 24A on the center side of the pulverizing table 14 is promoted, and blowing of the biomass to a fine pulverization region 24B where fine pulverization is made by the pressing of the pulverizing rollers 16 is also promoted.

Particularly, although the biomass powder (coarse particles) that is classified and dropped by the classifier 19 flies up, the biting between the pulverizing rollers 16 and the pulverizing table 14 is promoted by supplying the blowing gas 22.

That is, the biomass feedstock 11 falls to the pulverizing table 14 side via the feedstock supply pipe 12, and is pulverized by the table liner 14b of the pulverizing table 14 and the pulverizing rollers 16. During this pulverization, the blowing gas 22 is input from an upper portion of the central portion of the pulverizing table 14 so as to promote smooth movement of woody biomass on the table liner 14b of the pulverizing table 14 and separation of an entangled feedstock.

As a result, the pulverized particles in which movement or dispersion of woody chips is promoted pass through the upstream side of the pulverizing rollers 16, and move to the downstream side.

Particularly, since the woody chips and biomass powder (coarse particles) with a large particle diameter have a large relative velocity difference between the table liner 14b of the pulverizing table 14 on the inner peripheral side and the pulverizing rollers 16, the bitten feedstock is sheared into coarse particles, and moves to the wake flow side.

The coarse particles that have moved to the wake flow side have loose fibers, and are squeezed into fine powder by the pulverizing rollers 16 and the pulverizing table 14.

In this way, in the present invention, the biomass powder (fine powder) 17 on the table liner 14b of the pulverizing table 14 moves to the outer peripheral side satisfactorily due to the centrifugal force caused by the rotation of the pulverizing table 14 and the blowing gas 22 from the central portion of the pulverizing rollers 16. As a result, a woody biomass feedstock can be efficiently pulverized.

Although air can also be used for the blowing gas 22, high-temperature (up to about 300° C.) gas or air can also be used.

Although drying of the woody biomass all the way to its inside cannot be performed by introducing high-temperature gas or air, the surface of the biomass is dried, and separation of the entangled coarse particles becomes easy.

If a large amount of blowing air is input into the pulverizing rollers 16 more than needed, combustion in the boiler furnace becomes unstable in a case where the pulverized fine powder is directly combusted. In order to input air from the center of the pulverizing rollers 16, the amount of the conveying gas 18 that blows upward from the outer peripheral portion of the pulverizing rollers 16 becomes less.

In the present embodiment, the supply ratio of the blowing gas 22 is set to around 10 to 20% of the total.

As a result, since the gas amount of 90 to 80% compared to the related art becomes the conveying gas 18, the biomass powder (coarse particles) with a relatively large particle diameter rises immediately after the blowing-up. However, since the amount of the blowing-up air is small, the biomass powder loses its speed, and falls onto the pulverizing table 14.

On the other hand, the biomass powder (fine particles) 17 rides on an air stream, passes through the classifier 19, and is discharged to the boiler furnace side.

Further, in a case where a opening portion 21c is provided at the lower end portion of the introduction pipe 21a as illustrated in FIG. 2, this is preferable because entrainment of the biomass feedstock 11 or biomass powder (coarse particles) into the pulverizing rollers 16 is promoted by providing the opening portion 21c on the upstream side in the rotational direction rather than providing the opening so as to face the pulverizing rollers 16.

Second Embodiment

Figure 3:
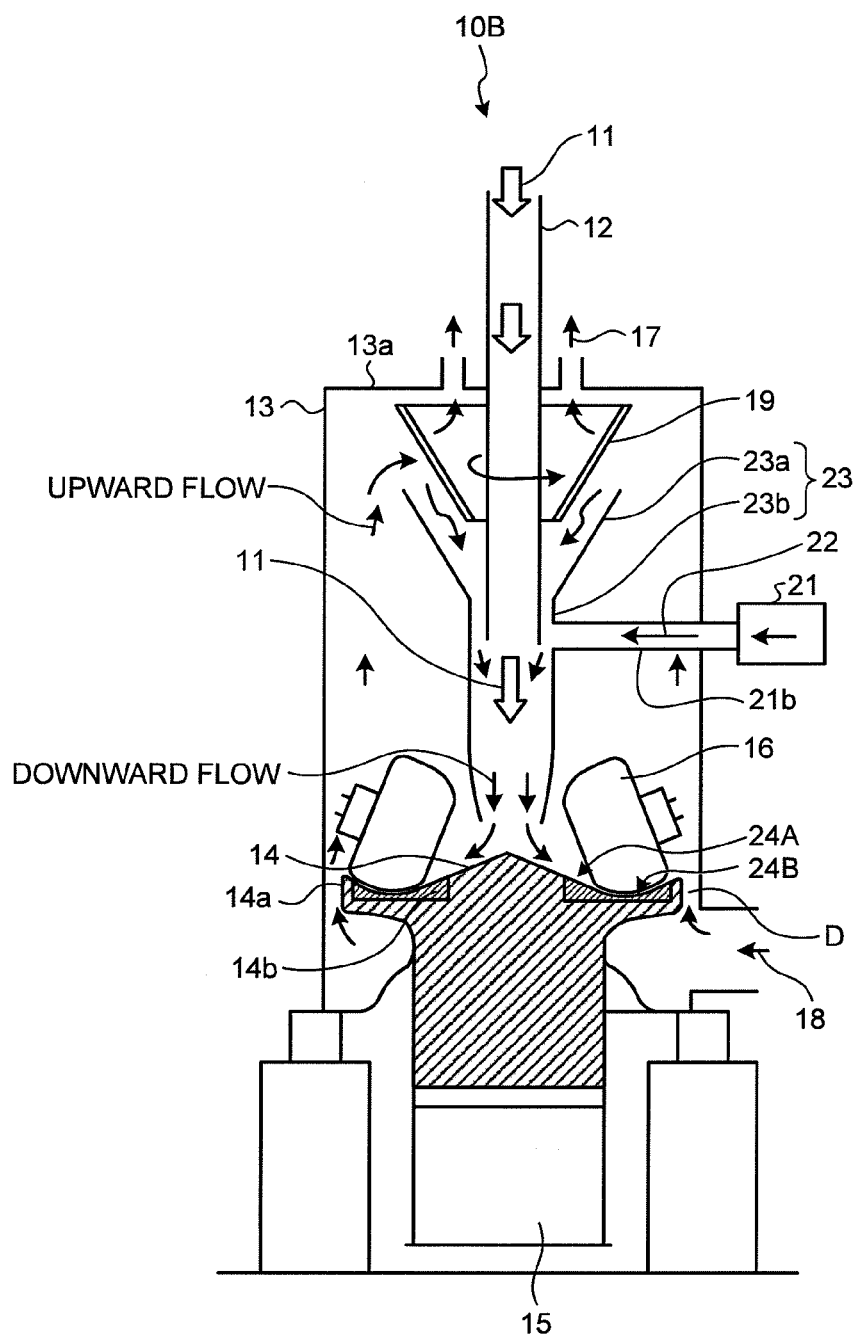
FIG. 3 is a schematic view of a biomass pulverizing apparatus according to a second embodiment.

A biomass pulverizing apparatus according to a second embodiment of the invention will be described with reference to the drawing. FIG. 3 is a schematic view of the biomass pulverizing apparatus according to the present embodiment. Note that, the same members as the components of the biomass pulverizing apparatus according to the first embodiment will be designated by the same reference numerals, and the description thereof will not be repeated.

As illustrated in FIG. 3, a biomass pulverizing apparatus 10B according to the present embodiment causes the supply pipe 21b and the tubular portion 23b to directly communicate with each other from the blowing gas introduction section 21, and supplies the blowing gas 22 into the tubular portion 23b of the funnel-shaped rectifying member 23, in the supply of the blowing gas 22 in the biomass pulverizing apparatus 10A according to the first embodiment.

Then, the biomass powder (coarse particles) and the biomass feedstock 11 that are dropped by the blowing gas 22 fall toward the central portion of the pulverizing table 14 so as to promote the movement of the biomass feedstock 11 and the biomass powder (coarse particles) dropped to the pulverizing table 14 to the pulverizing rollers 16 side.

Thereby, the introduction pipe 21a for the introduction of the blowing gas 22 according to the first embodiment can be omitted, and simplification of the apparatus can be realized.

Third Embodiment

Figure 4:
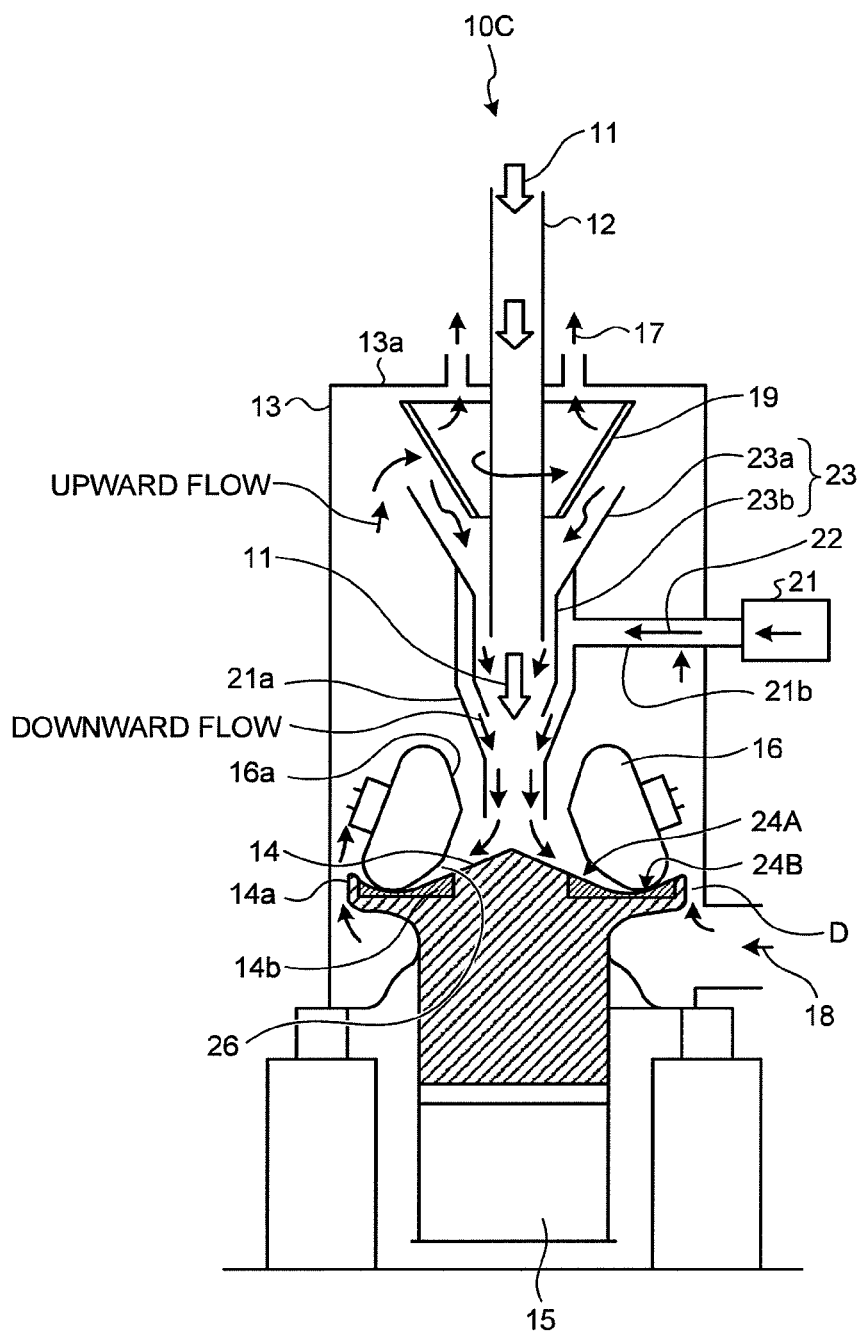
FIG. 4 is a schematic view of a biomass pulverizing apparatus according to a third embodiment.

A biomass pulverizing apparatus according to a third embodiment of the invention will be described with reference to the drawing. FIG. 4 is a schematic view of the biomass pulverizing apparatus according to the present embodiment. Note that, the same members as the components of the biomass pulverizing apparatus according to the first embodiment will be designated by the same reference numerals, and the description thereof will not be repeated.

As illustrated in FIG. 4, a biomass pulverizing apparatus 10C according to the present embodiment forms the shape of the pulverizing rollers 16 into a tapered shape by chamfering (16a) small-diameter end portions on the center side of the pulverizing table 14 in the biomass pulverizing apparatus 10A according to the first embodiment. As a result, a larger gap 26 compared to the related art is formed between the pulverizing rollers 16 and the pulverizing table 14.

Particularly, since rough chips of about 10 to 20 mm are intermingled in the woody biomass feedstock, it is necessary to facilitate biting to the rough pulverization region 24A. Further, the bitten feedstock is gradually pulverized and needs to be pulverized to a required particle diameter.

In the present embodiment, since the gap 26 between the pulverizing rollers 16 of an inlet portion and the pulverizing table 14 is enlarged during introduction of the biomass feedstock 11, the introduction becomes easy.

Woody chips whose top size is about 25 mm, and the woody biomass of the coarse particles (about 3 to 10 mm) that are classified by the classifier 19 and are dropped and recycled are intermingled on the upstream side (the center side of the pulverizing table 14).

Since the biomass having such a coarse particle diameter is not suitable for compression pulverization using the pulverizing rollers 16 and the pulverizing table 14, it is necessary to finely cut the biomass to a middle size by a shearing action.

For this reason, small-diameter end portions on the center side of the pulverizing table 14 are chamfered (16a) into a tapered shape so as to make the circumferential speed difference between the pulverizing table 14 and the pulverizing rollers 16 maximum on the inner peripheral portion side, and a shearing force is given to the biomass feedstock 11 so as to divide the tissue of the woody biomass.

That is, since the speed on the small-diameter side of the pulverizing rollers 16 becomes extremely slow and becomes different from the speed on the pulverizing table 14 side by chamfering (16a) the small-diameter end portion into a tapered shape, the shearing force can be increased.

Further, the woody biomass divided into coarse powder moves to the downstream side (outer peripheral portion of the pulverizing table 14). This portion is finely pulverized to a predetermined size, using a structure in which the gap between the pulverizing rollers 16 and the pulverizing table 14 is set to be small similarly to the related art and a compressive force is generated in the bitten biomass feedstock 11.

Fourth Embodiment

Figure 5:
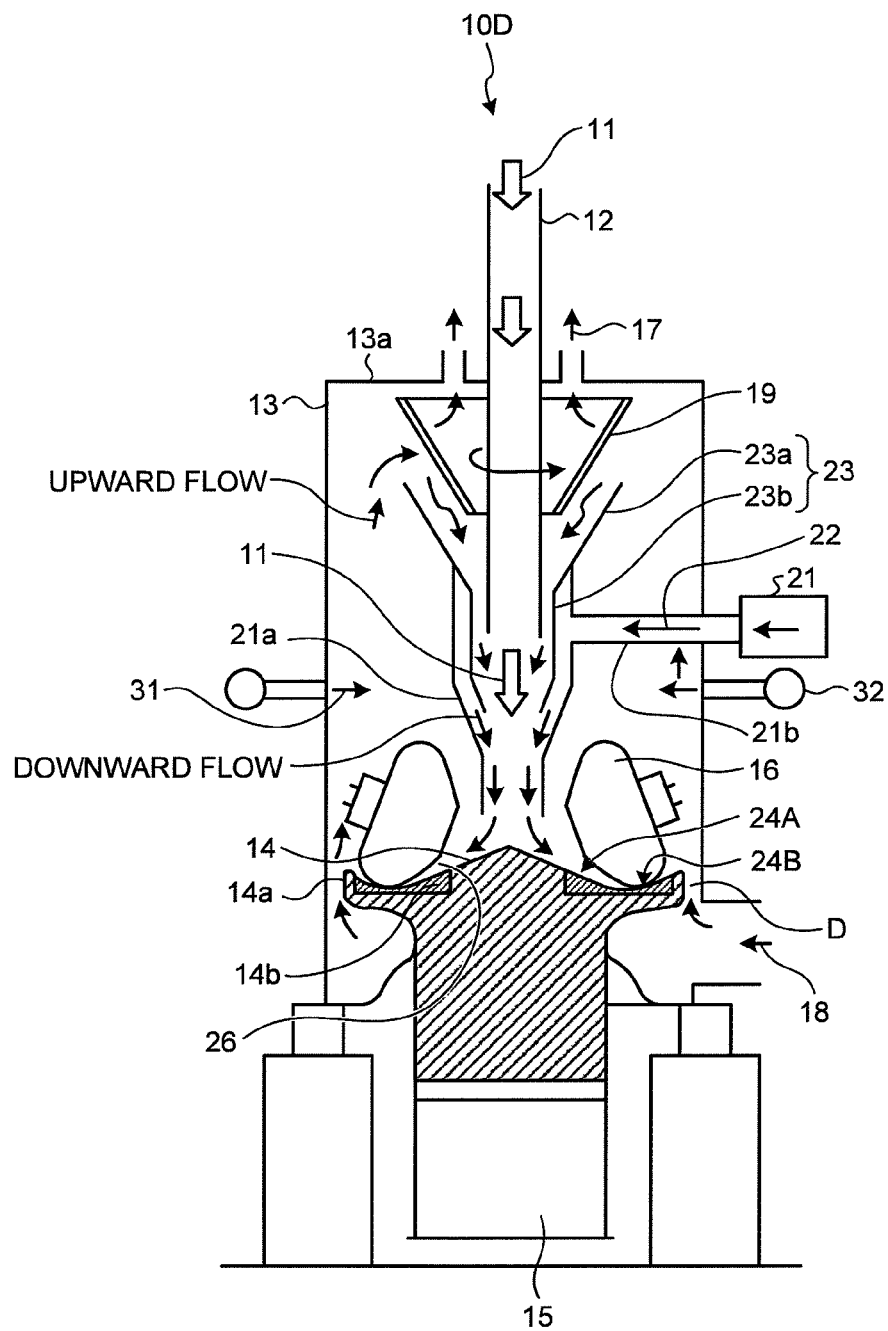
FIG. 5 is a schematic view of a biomass pulverizing apparatus according to a fourth embodiment.

A biomass pulverizing apparatus according to a fourth embodiment of the invention will be described with reference to the drawing. FIG. 5 is a schematic view of the biomass pulverizing apparatus according to the present embodiment. As illustrated in FIG. 5, a biomass pulverizing apparatus 10D according to the present embodiment provides a dispersion flow introduction section 32 that introduces dispersion gas 31 in a direction orthogonal to the vertical axial direction from the periphery of the pulverizing apparatus body 13, and disperses and drops the biomass powder of a predetermined particle diameter or more accompanied with the conveying gas 18, in the biomass pulverizing apparatus 10C according to the third embodiment.

By introducing the dispersion gas 31 from the dispersion flow introduction section 32, the biomass powder (coarse particles) with a larger particle diameter than a predetermined particle diameter accompanied with the conveying gas 18 is not made to reach the classifier 19 but is dispersed so as fall to the pulverizing table 14 side.

That is, the woody biomass discharged from the outer periphery of the pulverizing table 14 is brought into a state where the coarse particles to be pulverized again, and the fine particles to be taken out as a product are intermingled. These particles have the property of being entangled geometrically. Thus, in order to disperse the woody biomass entangled before entering the classifier 19 and to make classification easy, the dispersion gas 31 is introduced from the outer peripheral side of the apparatus body 13 in the portion above the pulverizing rollers 16 so as to perform classification.

In the present embodiment, the supply ratio of the blowing gas 22 is set to around 10 to 20% of the total, and the supply ratio of the dispersion gas 31 is set to around 10%.

As a result, since the gas amount of 80 to 70% compared to the related art becomes the conveying gas 18, the biomass powder (coarse particles) with a relatively large particle diameter rises immediately after blowing-up. However, since the amount of the blowing-up air is small, the biomass powder loses its speed, and falls onto the pulverizing table 14.

Together with this, the classification effect is further promoted by the dispersion gas 31.

Further, the flow velocity of the conveying gas 18 that reaches the classifier 19 becomes around 4 m/s by setting the flow velocity of the conveying gas 18 in the pulverizing apparatus body 13 to about 20 m/s, setting the flow velocity of the blowing gas 22 to about 10 m/s and setting the flow velocity of the dispersion gas 31 to about 20 m/s. Note that, these flow velocities can be appropriately adjusted according to changes in biomass properties and pulverization load.

Fifth Embodiment

Figure 6:
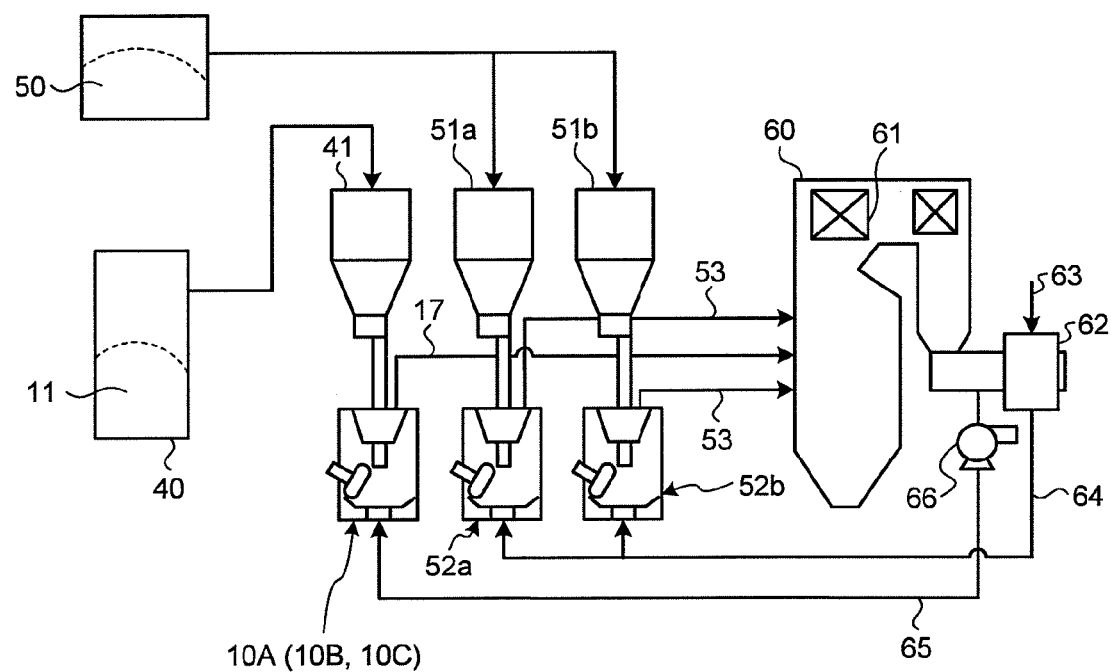
FIG. 6 is a schematic view of a biomass/coal mixed-combustion system including a boiler furnace according to a fifth embodiment.

A biomass/coal mixed-combustion system including a boiler furnace according to a fifth embodiment of the invention will be described with reference to the drawing. FIG. 6 is a schematic view of a biomass/coal mixed-combustion system including a boiler furnace according to the present embodiment.

As illustrated in FIG. 6, the above-described biomass pulverizing apparatus 10A (10B, 10C) is applied to the biomass/coal mixed-combustion system including a boiler furnace according to the present embodiment.

As illustrated in FIG. 6, the biomass/coal mixed-combustion system according to the present embodiment includes a biomass storage facility 40 in which the biomass feedstock 11 that is primarily pulverized (coarsely crushed) and dried to a predetermined particle diameter or less, if necessary, is stored, the biomass pulverizing apparatus 10A (10B, 10C) including a biomass hopper 41 to which the biomass feedstock 11 is supplied, coal pulverizing apparatuses 52a and 52b including hoppers 51a and 51b that receive coal 50, and a boiler furnace 60 to which the biomass powder 17 obtained by the biomass pulverizing apparatus 10A (10B, 10C) and a coal powder 53 obtained by the coal pulverizing apparatuses 52a and 52b are supplied.

The biomass feedstock 11, such as wood waste, is assorted into a certain degree of size, stored in the biomass storage facility 40 as biomass chips, and then supplied to the biomass hopper 41. The biomass chips are supplied to the biomass pulverizing apparatus 10A (10B, 10C) from the biomass hopper 41 and are pulverized by the pulverizing table 14 and the pulverizing rollers 16. Biomass pulverized matter and coal pulverized matter after pulverization are supplied to the boiler furnace 60, and biomass powder and coal powder are mixed and combusted within the boiler furnace 60.

A fuel supply nozzle and a burner that operates with this nozzle are disposed in a furnace body of the boiler furnace 60. The combustion exhaust gas generated by combustion heats a heat-transfer tube 61 disposed within the furnace, and is sent to a flue. An air heater (AH) 62 is provided in the middle of the flue provided in a furnace outlet of the furnace body, and the combustion exhaust gas that has passed through the air heater 62 is discharged to the atmosphere through an exhaust gas treatment facility (not illustrated), such as an ash trapping device.

High-temperature air 64 generated by heated ambient air 63 using the air heater 62 is supplied to the coal pulverizing apparatuses 52a and 52b and is used for drying of coal. Further, a portion of a combustion exhaust gas 65 is supplied to the biomass pulverizing apparatus 10A (10B, 10C) by an induction fan 66 and is used for classification or drying of the biomass.

By providing the system including the biomass pulverizing apparatus according to the invention in this way, biomass pulverization becomes good. Thus, stable combustion is possible without lowering combustion performance when pulverized matter is directly introduced into a combustion device.

Further, since the total amount of the blowing gas does not change compared to the related art, it is possible to stably operate the biomass pulverizing apparatus within a range of the amount of air required for a combustion facility without a change in the primary air.

REFERENCE SIGNS LIST

10A TO 10D Biomass pulverizing apparatus
11 Biomass feedstock
12 Feedstock supply pipe
13 Pulverizing apparatus body
14 Pulverizing table
15 Drive section
16 Pulverizing roller
17 Biomass powder
18 Conveying gas
19 Classifier
21 Blowing gas introduction section
22 Blowing gas

The invention claimed is:

1. A biomass pulverizing apparatus comprising:
a pulverizing apparatus body including a feedstock supply pipe for supplying biomass feedstock from above in a vertical axial direction;
a pulverizing table for placing the supplied biomass feedstock;
a drive section for rotationally driving the pulverizing table;
a pulverizing roller for pulverizing the biomass feedstock by a pressing force, the pulverizing roller being operated in conjunction with the rotation of the pulverizing table;
a blower unit for forming an upward flow upward from below on an outer peripheral side of the pulverizing table so as to jet conveying gas for conveying the pulverized biomass powder in an air stream;
a classifier for classifying the biomass powder accompanied with the conveying gas, the classifier being provided inside the top of the pulverizing apparatus body;
a funnel-shaped rectifying member provided below the classifier, the rectifying member including
a funnel portion for receiving classified biomass powders, and
a tubular portion for dropping the classified biomass powders;
a blowing gas introduction section for supplying blowing gas toward a central portion of the pulverizing table so as to promote movement of the biomass feedstock;
an introduction pipe disposed around the tubular portion, for introducing the blowing gas toward the pulverizing table; and
a dispersion flow introduction section for introducing dispersion gas in a direction orthogonal to the vertical axial direction from a periphery of the pulverizing apparatus body toward the introduction pipe so as to disperse and drop biomass powder accompanied by the conveying gas, wherein the dispersion flow introduction section is provided between the classifier and the pulverizing roller in the vertical axial direction.

2. The biomass pulverizing apparatus according to claim 1, wherein the blowing gas is heated.

3. The biomass pulverizing apparatus according to claim 1, wherein a shape of a small-diameter end portion of the pulverizing roller on a center side of the pulverizing table is made into a tapered shape.

4. A biomass/coal mixed-combustion system comprising:
the biomass pulverizing apparatus according to claim 1;
a coal pulverizing apparatus for pulverizing coal feedstock; and
a boiler furnace to which biomass powder pulverized by the biomass pulverizing apparatus and coal powder pulverized by the coal pulverizing apparatus are supplied.

* * * * *